May 10, 1949.　　　　J. S. LIDDLE ET AL　　　　2,470,037
ELECTRICAL METERING ASSEMBLY
Filed July 9, 1946　　　　　　　　　　　　　　2 Sheets-Sheet 2
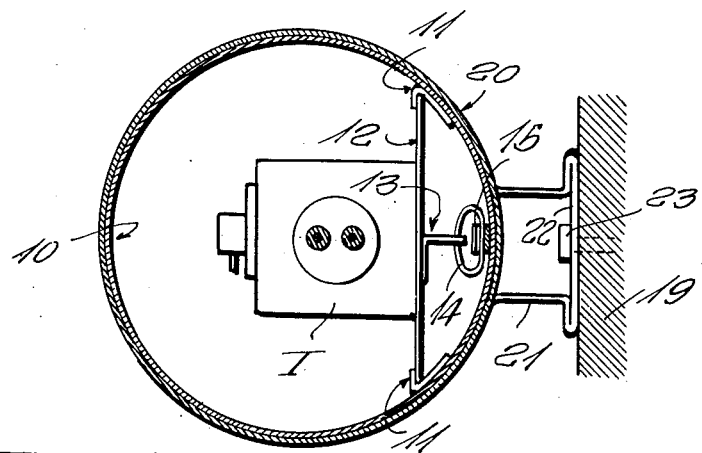
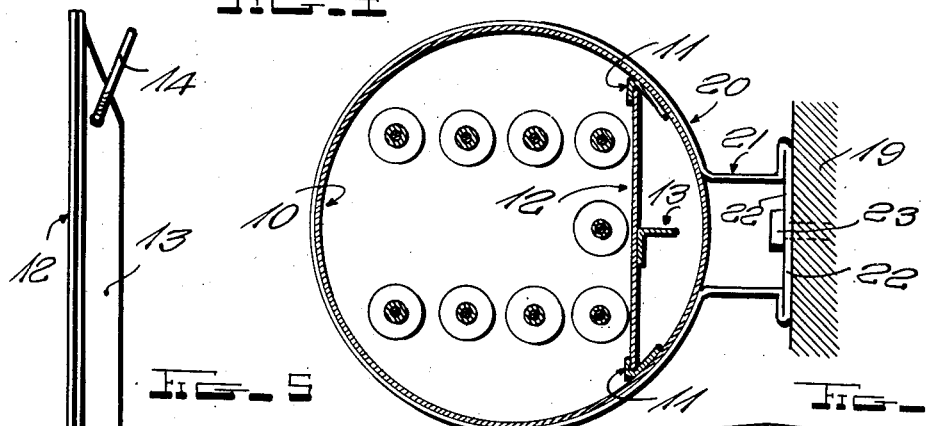
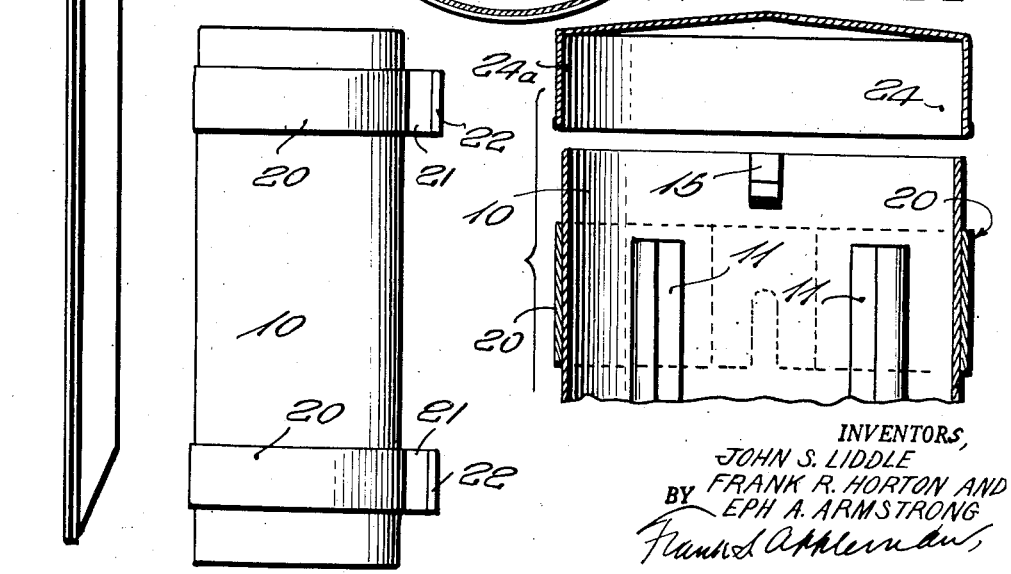
INVENTORS,
JOHN S. LIDDLE
FRANK R. HORTON AND
BY  EPH A. ARMSTRONG
ATTORNEY.

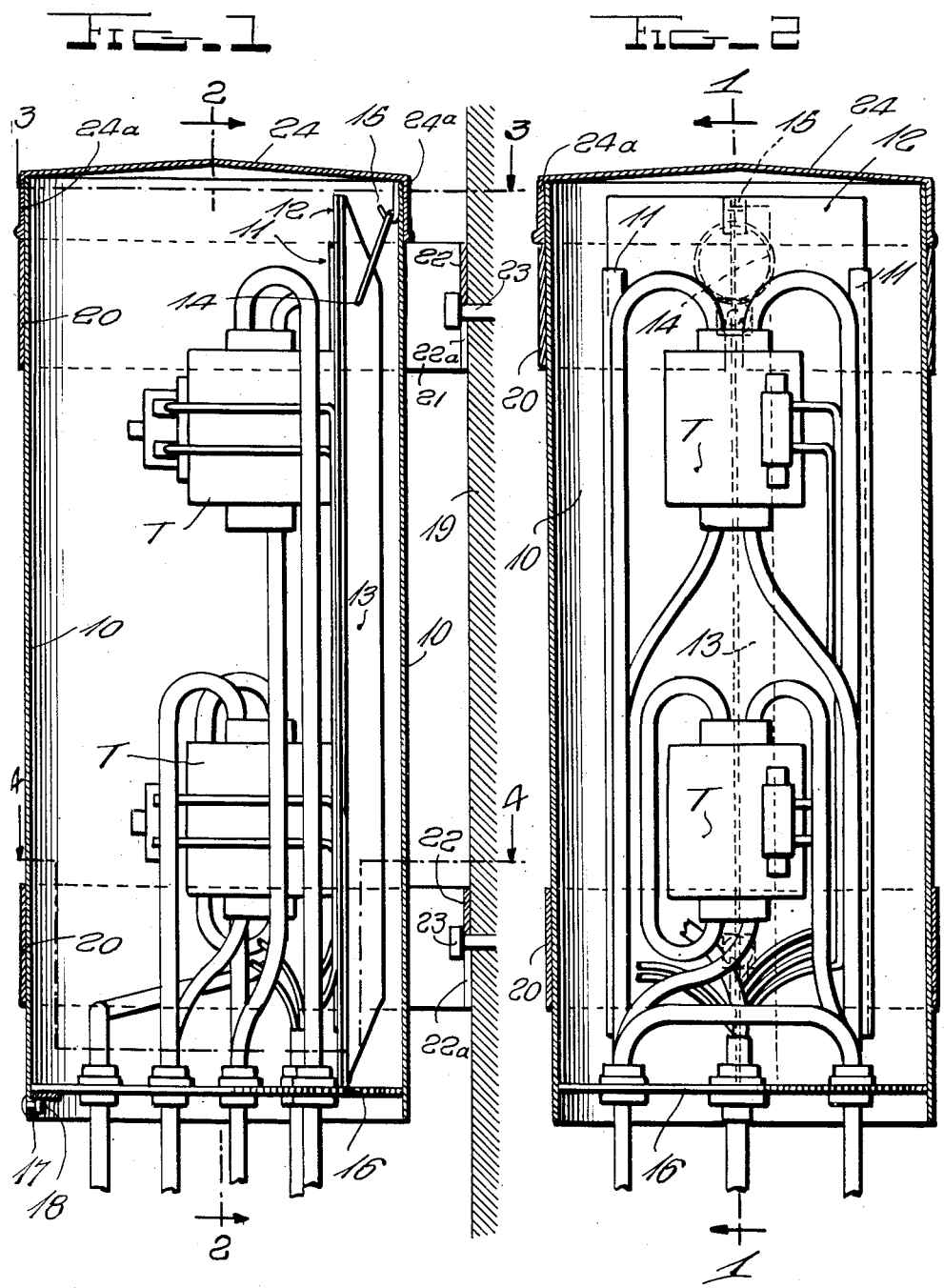

Patented May 10, 1949

2,470,037

UNITED STATES PATENT OFFICE 2,470,037

ELECTRICAL METERING ASSEMBLY

John S. Liddle, Frank R. Horton, and Eph A. Armstrong, El Dorado, Ark.

Application July 9, 1946, Serial No. 682,180

3 Claims. (Cl. 174—52)

This invention relates to electrical metering assemblies, and has particular relation to assemblies of this type designed for outdoor service. While the invention pertains more particularly to the housing for the transformer structure used for metering, the invention actually reaches to the complete assembly.

Various types of electrical apparatus for outdoor service have been provided, these generally being more sturdy than similar apparatus used for indoor service, since the outdoor service presents a number of serious conditions—of which weather conditions are an example. While these structures necessarily include a housing, the nature of the apparatus used is generally such as to be more costly, etc., as compared with apparatus used indoors, since the indoor service is more or less protected from the weather conditions, and is therefore less likely to become deranged or otherwise affected and become unsuitable for service.

The present invention has for its underlying feature, the use of indoor measuring transformers for outdoor service, thus making possible the use of less costly electrical assemblies for such outdoor service than has heretofore been deemed practicable. Such use does not provide a complete substitution for the outdoor assemblies where the latter are designed for extremely heavy duty, but within certain limits the change can be provided and obtain maximum results in operation and in stability, with the installed structure such as to materially reduce the cost of the usual installations.

Another feature of the present invention is provided by the internal arrangements of the housing, these being such that it is possible to position and remove the electrical apparatus as a unit, and in such form that the unit can be constructed at a point remote from the point of installation and then inserted, as a unit, within the housing where it is maintained in position with but little difficulty, and from which it can be removed, as a unit, without material difficulty. This permits the electrical unit to be fabricated at the electrical works where the unit is completed, after which it is the unit that is transported to the housing and positioned therein.

The assembly can be produced by the use of practically all types of indoor current and/or potential transformers to accurately meter the electrical energy consumed by an electric circuit not in excess of 600 amperes to 2300/4160 volts, these values representing the limits before referred to. Such transformers can be arranged in different combinations to provide different results.

For instance, by arranging one two-wire and one three-wire current transformer, of the desired size, in developing the unit, the assembly may be used to meter a four-wire, three-phase delta circuit of 240 volts. Again, by the use of three two-wire current transformers in developing the unit, it can be used to meter a four-wire, three-phase star circuit of 120/208 volts. Again, by using two two-wire current transformers and two four-to-one ratio potential transformers in developing the unit it can be used to meter a three-phase three-wire 480 volt circuit, having only 120 volts on the meter potential coils.

Another example is by the use of two current transformers of desired size and two twenty (20) to one (1) ratio potential transformers; this housing can be used to meter the energy consumed by a circuit of 2300/4160 volts.

These are a few of the possibilities which can be employed in developing the unit. By combining any arrangement of transformers within the housing in this way, it is possible to install necessary metering transformers in a very limited space; it also makes a safer installation, inasmuch as all connections are confined to one transformer housing in an orderly manner.

The housing is itself substantial in construction and arrangement and able to withstand all weather conditions, as well as meeting all service conditions, doing this with a structure that is comparatively compact, readily positioned in the desired location and in such form as to be especially applicable for service where the installation is to present a neat and attractive appearance.

To these and other ends, therefore, the nature of which will be more clearly understood as the invention is hereinafter more fully disclosed, said invention consists in the improved construction and combination of parts hereinafter fully described, illustrated in the accompanying drawings, and more particularly set forth in the appended claims.

In the accompanying drawings, in which similar reference characters indicate similar parts in each of the views:

Figure 1 illustrates a transverse sectional view of the assembly showing a pair of transformers positioned therein, the section being taken on the line 1—1 of Fig. 2.

Figure 2 is a vertical sectional view taken on the line 2—2 of Fig. 1.

Figure 3 is a horizontal sectional view taken on line 3—3 of Fig. 1.

Fig. 4 is a horizontal sectional view taken on the line 4—4 of Fig. 1.

Figure 5 is a side elevation of the casing with the top omitted, the view being on a small scale.

Figure 6 illustrates a detail sectional view of the upper zone of the casing, the cap being shown as raised.

Figure 7 is an edge view of the reinforce for the supporting plate.

The assembly that presents invention generally includes an open-ended tubular housing which may be of a desired cross sectional contour but is preferably formed circular in contour, since such contour will provide maximum strength with minimum weight. To illustrate somewhat of the dimensions of the assembly, it may be noted that the length of the housing is approximately 30 inches with the diameter approximately 12 inches, the housing shell being made from 20-gauge iron or steel. The shell 10 is provided with opposed guides 11 also extending in the direction of length of the shell and secured internally of the shell wall, the guides — two in number — being spaced apart a desired distance sufficient to receive a plate 12 with the latter having a desired width, such width in the dimensions indicated being approximately 8.375 inches, a dimension which places the plate as spaced from the axis of the shell; the plate 12 has a length slightly less than the length of the shell and is, itself, reinforced by an angular reinforcing member 13, also extending in the direction of length of the plate and preferably located symmetrical relatively to the width of the plate. The re-inforce also serves the function of providing for the support of the plate within the shell, the reinforce carrying a ring member 14 in its upper zone, with the ring designed to be hooked over a supporting hook 15 carried in the upper zone of the shell.

The plate 12 also carries at its lower end a bottom 16 which is designed to closed the lower end zone of the shell, and hence is dimensioned to fit within the shell and is secured to the plate at the proper point to ensure that the plane of the plate length will be equi-distant from the shell wall at the top and the bottom of the shell. In practice, the bottom 16 is supported by a lug 17 removably positioned below the bottom and held by a removable nut and bolt structure 18, the lug being positioned on the side of the bottom zone of the shell approximately diametrically opposed to the position of the hook 15 in the top zone of the shell, the hook and the lug thus properly positioning the plate and bottom against vertical movement under the weight of the plate and of the apparatus carried thereby. The bottom is provided with a plurality of "knock-out" formations designed to receive porcelain bushings for such circuit connections as may be required, Fig. 4 indicating an arrangement of two rows of such formations in spaced apart relation, with each row containing four formations, a single formation adjacent the face of plate 12 being located between the two rows, this being designed to also receive a bushing with the opening designed for a secondary cable outlet.

To illustrate the unit assembly, the plate is shown as carrying a plurality of transformers T and their linkages.

The assembly is designed to be located at any desired point, as, for instance, being mounted on a post 19, and to provide for ready positioning, the shell has a pair of external bands 20 located, respectively, at proper points relative to the ends of the shell, each band including an extension 21 which is fashioned with a wall 22 provided with a slot 22a extending upwardly from its lower margin, thus permitting ready positioning of the assembly on a suitable support, such as a bolt 23, carried by the pole or building.

The shell is provided with a cover 24, preferably slightly cone-shaped to shed water, and with a downwardly extending annular wall 24a which is designed to overlie the upper end of the shell.

This structure, thus far described, forms a weatherproof housing for the electrical equipment which is designed to provide the metering action. As is apparent, a removal of the nut and bolt 18 with lug 17 and the unhooking of ring 14 from hook 15, after the cover 24 has been removed, will permit the plate and bottom to be moved downwardly within the shell, the practice being to simply apply a suitable rope or other member to the ring 14, raise the latter off of the hook and then lower the plate and bottom as a unit bodily through and out of the shell through the lower open end of the latter, without removal or disturbing the position of the shell on the support.

Obviously, the structure can be assembled by the reverse of this action, simply drawing the plate upwardly into the shell until the ring can be properly hooked and the lug then secured below the bottom 16.

One advantage of this latter way of assembling and taking down the structure comes from the fact that since the plate 12 and bottom 16 are removable bodily from the shell as a unit, the plate can receive its electrical equipment outside of the shell, thus making it possible for the electrical equipment to be assembled and positioned on the plate at the electrical supply house or manufacturing plant, thus completing the positioning of the transformer structures—which may reach as high as four individual transformers—and the connections therefor which would be located within the housing, and thus permit the workmen to secure the free ends of the extensions of such connections—and which pass through the porcelain bushings—to the proper permanent line wiring structures. Since the electrical equipment remains permanently positioned on the plate whether the latter be within or without the housing, this entire electrical assembly forms a unit which can be positionable within or removed from the housing bodily and as a unit in the manner referred to above, thus making it possible to provide for judicious selection of transformers, and an efficient mounting thereof on the plate while the plate is entirely free from the housing; it will be apparent that the entire electrical assembly, being fashioned at the place of supply, can be arranged on the plate with the desired compactness that may appear essential, without liability of the arrangement being deranged either when positioning the unit within the housing or removing it from the housing.

An important advantage of the construction comes from the fact that the assembly when completed in this way is completely weather-proof, so that it is possible to utilize electrical equipment not normally designed for outdoor service. For instance, the transformers employed in producing the unit may be of the type usually employed in connection with indoor service and which, because of the latter, are generally of considerably lower cost, thus providing for a material saving in the cost of production and maintenance of the asemblies. In addition, such smaller transformers permit of the selective grouping which will enable metering under varied conditions, and will provide this result by the use of a housing that is not only neat and attractive in appearance, but the dimensions of which are such as to not appear bulky. And since all of the transformers used are carried within the single housing, it is possible to avoid the necessity of providing a housing for individual transformers as is the general practice at present.

Heretofore, metering apparatus for outdoor service generally presented the transformer assemblies as individuals with each transformer having its individual housing, and having the needed strength for such service; as a result, a unit designed for providing particular service such as would require more than a single transformer, was generally made up of a plurality of such individuals with the necessary linkages provided externally of the housing.

In the present invention, although the housing is comparatively small, each contains the entire assemblage of needed transformers, with the linkages internal of the housing, enabling the fashioning of the desired number and arrangement of transformers into the unitary assembly carried by plate 12, under ideal working conditions; as many as four transformers may thus be grouped together, with the proper arrangement of linkages, and all designed to be located in the single housing, leaving only the connections with the line circuits to be made externally. Since the plate 12 and its permanently-positioned transformer assemblage is arranged as a unit and handled bodily, assurance is had that the proper assemblage is made by expert workmen; and should any mishap to the assembly occur during service, the bodily removal of the plate and its content, enables proper repairs to be made, together with necessary testing, by expert workmen, so that assurance is had that the repaired assemblage will provide maximum efficiency.

In addition, should it be desired to change the metering characteristics of the metering station, ready substitution of one laden plate 12 for another having a different arrangement, can be provided with a minimum loss of time in making the change, since the new plate can be fashioned independently of the station, brought to the station, and the change made, the station requirements, other than the substitution plates, being the disunion of the previous external connections and the proper restoration of such external connections.

While we have herein shown and described a preferred form of housing assemblage, it will be understood that changes and modifications therein may be found desirable or essential in meeting the exigencies of service and/or the individual desires of users; we therefore reserve the right to make any and all such changes or modifications as may be deemed desirable and/or essential, insofar as the same may fall within the spirit and scope of the invention as expressed in the accompanying claims, when broadly construed.

We claim:

1. In electric metering assemblies of the transformer type designed for outdoor service, and in combination, an open-ended tubular housing shell with its axis extending substantially vertical, said shell having internal opposed vertically-extending guides secured thereto, a vertically-extending plate carrying metering equipment of the metering transformer type positioned by said guides in spaced relation to such axis, said plate having a vertically-extending angular reinforce and also having a planar bottom extending at right angles to the direction of length of the plate, said bottom being dimensioned to close the bottom zone of the housing shell and having means adapted to potentially provide for the passage of transformer circuit connections, disengageable means cooperative with the upper end zones of the reinforce and the shell for supporting said plate within the housing, a removable cover for the upper end of the shell, and external means for supporting the housing, said plate forming the support for the transformer equipment and forms therewith a unit bodily positionable within and removable from the housing by movements lengthwise of the housing shell, whereby production of the unit assembly may be provided independently and with service attention provided without disturbing the position of the housing shell.

2. An assembly as in claim 1 characterized in that the disengaging means is in the form of a ring carried by the reinforce, and a hook member secured to the internal face of the shell wall.

3. An assembly as in claim 1 characterized in that the assemblage is designed for outdoor metering service, and further characterized in that the dimensions of the assemblage are such as to limit the dimensions of the transformers usable therein to dimensions similar to those of metering transformers normally employed under indoor service conditions.

JOHN S. LIDDLE.
FRANK R. HORTON.
EPH A. ARMSTRONG.

REFERENCES CITED

The following references are of record in the file of this patent:

UNITED STATES PATENTS

| Number | Name | Date |
| --- | --- | --- |
| 1,243,902 | Van Raust | Oct. 23, 1917 |
| 1,462,026 | Booth | July 17, 1923 |
| 2,038,075 | Edwards | Apr. 21, 1936 |